United States Patent
Burgel et al.

(10) Patent No.: US 6,710,764 B1
(45) Date of Patent: Mar. 23, 2004

(54) METHOD AND SYSTEM FOR PROCESSING FORCE FEEDBACK EFFECTS GENERATED AT A HOST FOR PLAYBACK AT A PHYSICAL INTERACTION DEVICE

(75) Inventors: Thomas Burgel, Newark, CA (US); Roland Bosa, Fremont, CA (US)

(73) Assignee: Logitech Europe S.A. (CH)

( * ) Notice: Subject to any disclaimer, the term of this patent is extended or adjusted under 35 U.S.C. 154(b) by 0 days.

(21) Appl. No.: 09/568,092

(22) Filed: May 9, 2000

(51) Int. Cl.[7] .................................................. G09G 5/00
(52) U.S. Cl. ........................................ 345/156; 345/701
(58) Field of Search ................................. 345/156, 157, 345/161, 162, 163, 520, 522, 700, 701, 702; 341/20, 27

(56) References Cited

U.S. PATENT DOCUMENTS

| | | | |
|---|---|---|---|
| 5,734,373 A | 3/1998 | Rosenberg et al. | 345/161 |
| 5,889,670 A | 3/1999 | Schuler et al. | 364/186 |
| 5,929,607 A | 7/1999 | Rosenberg et al. | 320/166 |
| 6,005,551 A | 12/1999 | Osborne et al. | 345/161 |
| 6,020,876 A | 2/2000 | Rosenberg et al. | 345/157 |
| 6,028,593 A | 2/2000 | Rosenberg et al. | 345/156 |
| 6,036,495 A | 3/2000 | Marcus et al. | 434/45 |
| 6,252,579 B1 * | 6/2001 | Rosenberg et al. | 345/856 |
| 6,288,705 B1 * | 9/2001 | Rosenberg et al. | 345/163 |
| 6,300,936 B1 * | 10/2001 | Braun et al. | 345/156 |
| 6,343,349 B1 * | 1/2002 | Braun et al. | 711/154 |
| 6,424,356 B2 * | 7/2002 | Chang et al. | 345/701 |
| 2002/0003528 A1 * | 1/2002 | Rosenberg et al. | 345/157 |

* cited by examiner

*Primary Examiner*—Richard Hjerpe
*Assistant Examiner*—Ronald Laneau
(74) *Attorney, Agent, or Firm*—Townsend and Townsend and Crew LLP

(57) ABSTRACT

A low-cost method and system for processing force feedback effects generated at a host for playback at a physical interaction device by moving much of the force feedback effect processing from the device back to the host, and performing this in a manner that does not adversely affect latency effects or the load on the host processor. This is achieved by a novel combination of software and hardware techniques. In particular, the device hardware uses a low-cost microcontroller with limited processing capabilities, minimal memory and a low speed USB interface. The small memory also alleviates the need for buffer assignments and memory management. On the other hand, the device driver software residing on the host computer relies on the host's powerful processor to perform the majority of the effect management and computation, as well as translating all the complex high-level effect commands to a unique, small and simplified set of low-level commands which are periodically updated and transferred to the device for playback.

22 Claims, 10 Drawing Sheets

METHOD AND SYSTEM FOR PROCESSING FORCE FEEDBACK EFFECTS GENERATED AT A HOST FOR PLAYBACK AT A PHYSICAL INTERACTION DEVICE

BACKGROUND OF THE INVENTION

1. Field of Invention

The present invention relates generally to interface devices between human users and computers, and more particularly to methods and systems that provide force feedback effects to the user.

2. Description of the Prior Art

Computer systems are used extensively in different industries to implement application programs including sophisticated computer controlled simulations, office-work tasks and interactive games. These interactive games have soared in popularity in the mass market of home consumers who use personal computers. A computer system running an application program or an interactive game typically displays a visual environment to a user on a monitor or other visual display device. The user interacts with this computer-generated environment to play a game, experience a simulation, or other virtual reality environment, by using various typical input devices, such as a keyboard, a stylus and tablet, a trackball, a mouse, a joystick, a gamepad, a steering wheel, foot or hand pedals, or the like, that is connected to the computer system providing the displayed environment. The host computer updates the application program in response to the user's manipulation of an input device, and provides a corresponding feedback to the user via the display device. This virtual reality environment has also been extended to include audio speakers to provide the user with sound as well as visual displays to further enrich the user's interactive experience.

Another extension of the virtual reality environment has been directed towards providing tactile feedback to the user, more generally known as force feedback. The inclusion of force feedback in input devices has transformed these devices from input devices to interface or physical interaction devices, because besides providing input to the host computer, they also provide physical sensations to the user. These physical sensations are generated in the physical interaction device in response to it receiving force feedback effect commands from the host computer executing a force feedback-enabled application program. Typically motors or other physical actuation devices are coupled to the interface object which is connected to the host computer to generate these physical sensations. Such physical sensations include the rumbling of the device when the user crashes her car in a virtual environment; mechanical jolts when the user drives over a speed bump; drag forces simulating aerodynamic drag on flying surfaces and "kick back" of the joystick to simulate the firing of a gun and the like.

The initial introduction of force feedback-enabled devices had focused on providing high fidelity effects in rather expensive and high-end products. The more current trend has been to expand the use of force-feedback-enabled devices into the higher volume consumer market. Typical prior art force feedback-enabled device manufacturer's have focused their efforts on moving the control aspects of the force feedback effects to the device itself, by providing the devices with rather sophisticated local microprocessors and ample memory to allow the devices to store, manage, and compute all possible force effects locally. One reason for the large on-device memories has been the requirement of enabling the devices to be capable of playing back all the possible effect types that an application program has. This way, upon device initialization, an application program would download all its possible effect types to the device for on-device storage. A reason for including sophisticated on-device microcontrollers has been to avoid latency effects introduced by the time loop from the device to the host and back. Such time delays, although small, manifest themselves in the devices feeling choppy and rather delayed when playing back force feedback effects. Therefore these prior art approaches, upon the initialization of a device, download all the possible force feedback effect types to the device and store them in its memory for subsequent playback. Such prior art approaches are exemplified by devices manufactured based on technology from Immersion Corporation of San Jose, Calif. and described in various patents assigned to it as typified by U.S. Pat. No. 6,028,593, and devices manufactured based on technology from Microsoft Corporation of Redmond, Wash. and described in various patents assigned to it as typified by U.S. Pat. No. 6,036,495. The assignee herein, itself offers force feedback enabled devices based on the Immersion approach, such as the WingMan® Force joystick device. The limitations of these prior art approaches will be discussed below.

The DirectInput application program interface ("API") in Direct X, from Microsoft Corporation has become a de facto standard API used to control these devices on the Windows-based platforms, which is by far the most popular operating system for home computers and which represents the largest potential mass market for such devices. DirectX is targeted towards game developers to allow them to directly and with least overhead possible, talk to the existing hardware, without having to explicitly consider hardware-specific parameters. It can be viewed as a minimal abstraction of hardware. Between the game (application program) and the hardware there are device drivers, which realize the abstraction for their specific hardware. DirectInput presents all connected gaming devices in a uniform matter to the game; the game can query the device through DirectInput for data, its capabilities and adjust its controls accordingly.

A hardware device vendor has to provide the following components to get their device running and accepted as a standard DirectX compliant force-feedback device:

- a "driver", which is a piece of software that plugs into DirectInput, acts on requests from games to play/stop/change a force, and translates those requests into something the device understands under the best possible conservation of the fidelity;
- a list of forces, registered in a system-wide database called "registry", describing what effects are possible, and what the effect's limitations are in terms of timing resolution, additional complexity, advanced capabilities;
- a force-feedback capable device which performs the commands sent to it by the driver DirectInput's role in this architecture is shown in FIG. 1. DirectInput's role is simply to mediate and connect between the driver 114 and the device 116 and the application 110. The game's requests pass through to the driver 114, after the initial setup, almost unmodified. The driver's role in this architecture is merely a repackaging operation to strip down the application program's request(s) down to what the device has. For example, gaming effects written with their time parameter in psec. may need to be converted to msec. DirectInput 112 does a minimal amount of error checking and parameter normalization and the game's commands 110 end up at the driver 114 after a very thin layer of processing, which makes this approach very desirable in terms of performance, because by having only a small amount of processing, the application's commands reach the device with the least possible amount of latency, and leave more processing time for other tasks on the host.

DirectInput's force-feedback architecture was modeled after what is possible in devices, and devices were made with the DirectInput model in mind. Most devices have a more or less 1-to-1 correspondence in their internal workings to what DirectInput presents to a game. Most devices support a set of effects and a set of parameters for each effect. FIG. 2 shows this rather 1-to-1 correspondence between the game effects (those effects generated by the host application program) and the device effects (those effects downloaded to the device). The prior art devices provide sufficient local memory to allow it to download all possible game effects using their entire description to the device for storage and subsequent processing and playback. Typically games have anywhere from as few as two to three effects to as many as tens of effects. Upon initialization, the game (not shown) queries the device 210 for all possible effects 222, and downloads and stores these effects as on-device effects 212, thus resulting in a nearly 1-to-1 correspondence between the game and the on-device effects. Once the on-device memory is filled to its capacity, the device will typically reply with a "device-full' command.

During the execution of the game, the driver 224 asks the device 210 for an effect, and passes it any additional parameters. The local device processor will then execute the game's request and locally process the game effect(s) and play them back. As discussed above, this on-device approach has been pursued because the typical time loops involved in sending data from the device to the host for computation and its subsequent return to the device introduce undesirable latency effects which manifest themselves in the device behaving in an unstable or "choppy" manner while playing back effects.

Most prior art force-feedback devices essentially use similar approaches. These approaches try to model the DirectInput architecture with a sophisticated combination of hardware and firmware. There are essentially two sub-categories for this implementation path. One is the Microsoft SideWinder path, and the other is the Immersion/I-Force chip-based approach. Both of them share the necessity for complicated hardware and smart firmware, which results in high costs to implement. The discussion below as summarized in Table 1 provides a brief overview of how these architectures perform.

TABLE 1

Prior Art Approaches to Force Feedback Implementation

| | Microsoft Sidewinder | Immersion/I-Force |
|---|---|---|
| Effect Management | handled by firmware | handled by firmware |
| Memory management | handled by firmware | handled by driver |
| Force calculation and playback | handled by firmware | handled by firmware |
| Host-resident device driver | • adapt parameters to device capabilities<br>• parameter checking<br>• requests effect ID and<br>• sends serialized effect structure to device | • adapt parameters to device capabilities<br>• parameter checking<br>• requests effect ID and<br>• sends serialized effect structure to device<br>• memory management |

The SideWinder series of force feedback devices pushes most of the processing onto the device. The device is responsible for handling everything. The management of effects; management of memory; calculation of forces and playback thereof are solely handled by firmware. The driver doesn't have to do much besides adapt parameters to the capabilities of the device, i.e. stretch timings to values the firmware can handle, or correct out-of-range values for magnitudes or any of the other fields. After that, the driver asks the device for an effect handle, passing it the size needed; the device responds with either "device full", or returns a handle. Then, the driver sends out the serialized effect structure (i.e. converted from the DirectInput representation with memory blocks linked by pointers to a stream of bytes) to the device, and from there on directs the device to start/stop the effect with the given handle, or to dispose of it completely.

The Immersion approach is similar, however, with the difference that the device doesn't have to do all the work. The driver on the host keeps track of the memory usage and allocates/deallocates blocks from the memory as required to fit in effect structures. It also checks all parameters for computability, serializes the effect structures and sends them to the device, telling it where to store the data. This approach is more robust towards transmission errors that can occur, because of the tight control of the host. If a transmission error happens and gets detected, the host can re-transmit the information it wants on the device. In the first approach, the host's view of the device's memory and the device's view of its own memory can start to diverge in case of transmission errors.

The device, however, still has to do all the effect management, force computation and force output. However, the memory management is done in the host-based driver.

Typical prior art input devices interface to a host via either a serial or a game port, which require a vendor-specific driver to facilitate the interfacing. With the introduction of the Universal Serial Bus ("USB") standard to the computer hardware platforms, ideally the host would adapt to the device without the need for a vendor-specific driver.

USB defines a number of "device classes", which define the behavior of devices belonging to this class. There was previously only one class dealing with input devices, namely the "HID" (Human Input Device) device. HID devices are mice, keyboards and game controllers, for example. HID defines a rich set of descriptions which a device can use to describe its capabilities and limitations to the host. Ideally, the host would adapt to the device without the need for a vendor-specific driver.

HID does have one shortcoming, though, when it comes to force-feedback. As its name implies, it was designed for "Input Devices," and the notion of force-feedback was not included. Recently, there has been work done to define an extension of the HID class, in the form of "PID" (Physical Interaction Devices). Devices belonging to the PID class are devices that have a descriptor showing not only all the input usages (like with pure HID devices), but also output usages. "Usages" is a term from the HID specification and denotes a bit of information describing some partial aspect of a device. PID usages extend the HID usages with output functionality such that a device can let the host know that it can play constant forces, sine force and a spring, for example. Following the HID concept, a PID device should ideally work by just plugging it in, where the device tells the operation system what it can do, and the operating system adapts to the device's capabilities and limits, without the need for a specific driver.

Typical prior art PID devices need to have powerful processing capabilities. Just the storing of the PID descriptor needed for a typical device can take up to several hundred bytes, if not over a kilobyte of valuable memory space in the device. Moreover, since the PID usages define forces at a rather high level, in order to get from that high level to a level understandable by the motor(s) or actuator(s), a lot of processing (relatively speaking) is involved—compared to what usual cheaper microcontrollers are able to do. Therefore, in order to make a PID device interface properly, a vendor-specific driver is almost necessary, since the PID usages do not allow for the definition of every limitation and special case a device could have, such as limited steepnesses for envelopes or other similar limitations. If a device should handle all of the possible effects cases properly, it needs even more processing power.

Therefore, as described above, the prior art PID devices rely on powerful local microprocessors, large required memories, and hardware-specific device drivers to be able to properly interface and playback force feedback effects. This constraint on the device to have a powerful local microprocessor and a large memory is driven by the need to (i) have a device that is capable of playing back all game effects, and (ii) avoid undesirable latency effects that may be introduced by the delay caused by the communication loop from the device to the host and back. The powerful local microprocessor as well as the large required memory adds complexity and increases the cost of such force feedback devices. The key to commercial success in the mass market for PID devices is in reducing the cost of the components and especially the electronic components of such devices. Less expensive parts yield less expensive devices. Therefore, there is a definite need for less expensive force feedback devices, that provide a realistic level of force feedback effects to their users.

SUMMARY OF THE INVENTION

The present invention provides a low-cost method and system for processing force feedback effects generated at a host for playback at a physical interaction device ("PID") by moving much of the processing of the force feedback effects from the device back to the host, and performing this in a manner that does not adversely affect latency effects or the load on the host processor. This is achieved by a novel combination of software and hardware techniques. In particular, the devices' hardware design incorporates a low-cost microcontroller with limited processing capabilities, minimal memory and a low speed USB interface. The small memory also alleviates the need for buffer assignments and memory management. On the other hand, the device driver software residing on the host computer relies on the host's powerful processor to perform the majority of the effect management and computation, as well as translating all the complex application program effect commands to a unique, small and simplified set of on-device commands for processing and playback on the device. This is made possible by removing the constraint that the device must at all times possess the full range of effects that an application program has, and the constraint that the device must store entire effects blocks.

In one aspect of an embodiment of the present invention, the device driver software program stores all the application program effects in its host-based Virtual Device, and thus portrays an infinitely capable device to the application program.

In another aspect of an embodiment of the present invention, the device driver software program classifies the application program effects into a simulated effects and native effects categories, where simulated effects are effects which are independent of the response of the device (such as a constant force), and native effects are force effects which are dependent on the input and response of the device (such as a spring force). Native effects are slated for local processing by the device, whereas simulated effects are slated to be driven by the driver using the host. Since the effects requiring input from the device are "native effects," their local processing will not introduce any latency effects. Moreover, since simulated effects are not dependent on the device's position, any latency effects introduced by the delay in communication to and from the host, will not cause any instability issues and are not perceptible by the user.

In another aspect of an embodiment of the present invention, the device driver software program translates all the application program effects into a corresponding set of simplified effects. These simplified effects require substantially less space for storage, thus allowing for the reduction of on-device memory, which results in significant cost savings. The simplified effects include both simulated and native effects.

In another aspect of an embodiment of the present invention, the device driver software program periodically updates the device by transferring to it a subset of (n) simplified effects for on-device storage, which include at least one simulated effect, and which may also include as many as (n−1) native effects. The transferred subset represents a reduced set of effects as opposed to the entire set of application program effects, and thus requires less on-device storage capacity and an hence provides additional cost savings. The number of effects transferred from the driver to the device are determined by the available on-device memory. The most important (i.e. perceptible by the user) effects are typically the ones stored on the device. When a new, stronger effect is requested, one less perceptible effect on the device can be written over.

When multiple simulated effects are provided at the same time, they are summed in the driver to further simplify and reduce the data which needs to be transmitted to the device. The at least one transferred simulated effect sent to the device is a vector sum of all application program simulated effects determined by the device driver software program. The remaining on-device memory is used to store a plurality of native effects, which represent the at most (n−1) top prioritized native effects selected by the device driver software program. The periodic loading of the top (n−1) prioritized native effects effectively implement a swapping operation of the highest (n−1) top rated native forces.

These and other embodiments of the present invention are described in more detail in conjunction with the text below and attached figures.

DESCRIPTION OF THE SPECIFIC EMBODIMENTS

An embodiment of the present invention includes a hardware as well as a software portion, which are each described below separately.

I. System Hardware Description

Figure 1:
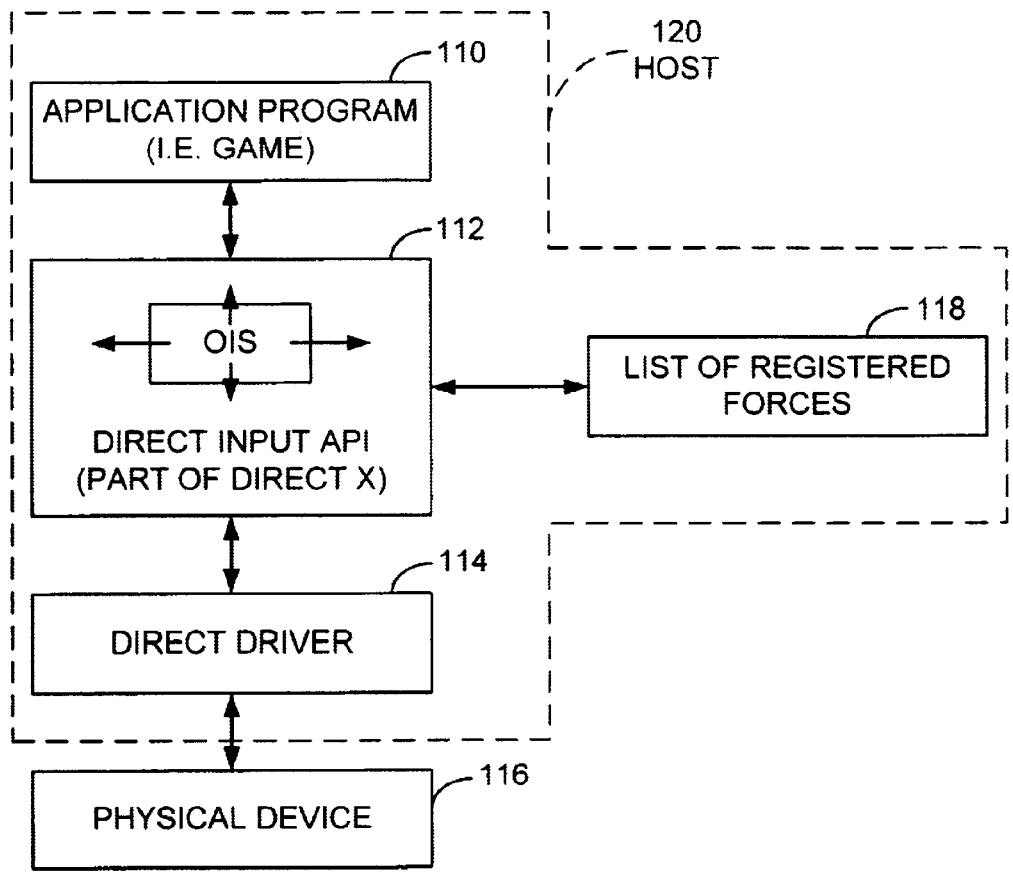
FIG. 1 is a conceptual block diagram illustrating the communication between an application program and a force feedback-enabled physical device.
Figure 2:
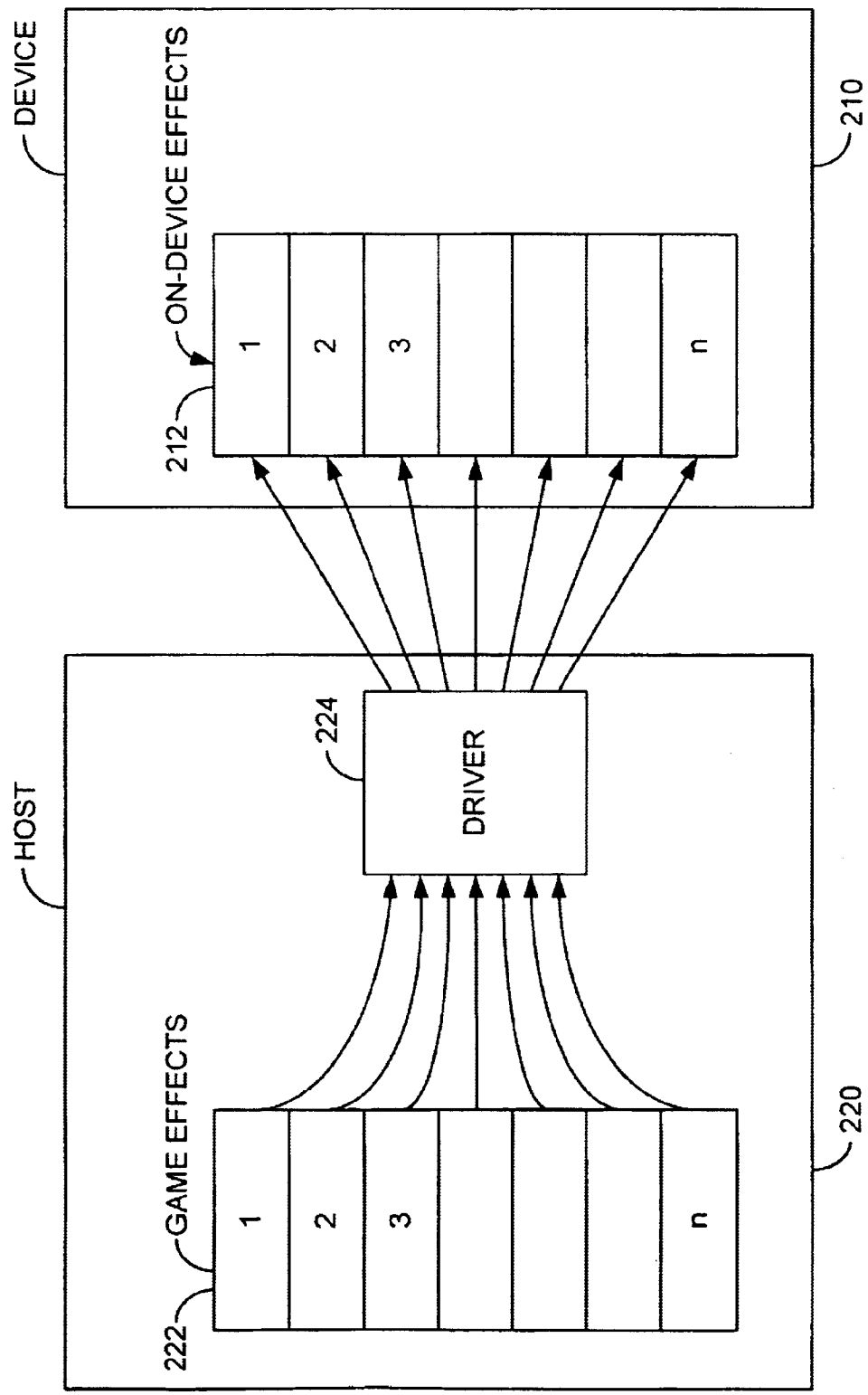
FIG. 2 is a conceptual block diagram showing a prior art correspondence between game effects and on-device effects.
Figure 3:
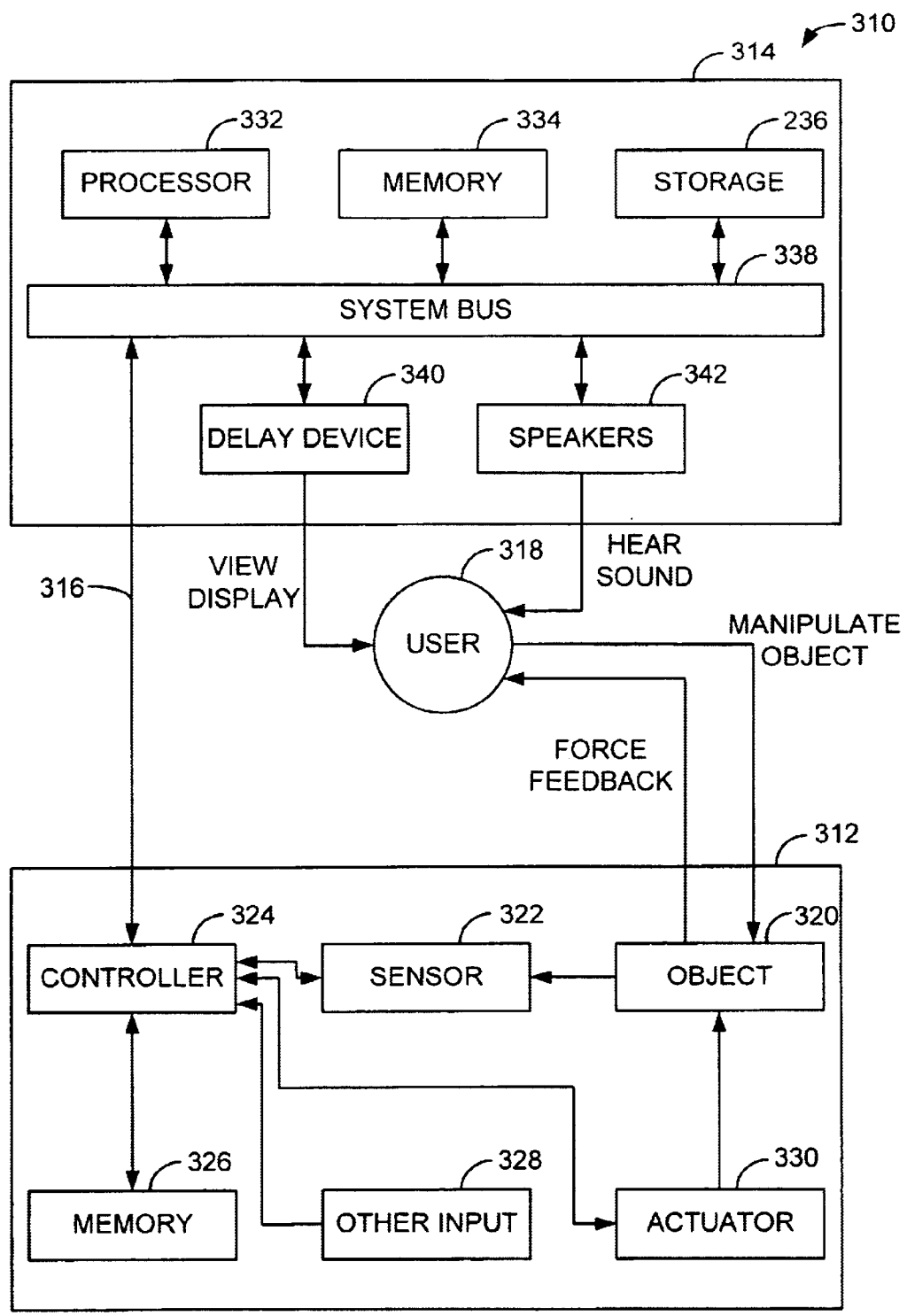
FIG. 3 is a block diagram of a system for controlling a force feedback-enabled device according to an embodiment of the present invention.

FIG. 3 is a block diagram showing a generic control system 310 of an embodiment of the present invention for a physical interaction device ("PID") controlled by a host computer system. The control system 310 includes a PID 312 and host computer system 314.

Host computer system 314 is preferably a personal computer, which operates under the Windows operating system. Alternately, host computer system 314 can be one of variety of intelligent hosts that may be connected to a television set, such as a home video game, a set top box, or other intelligent hosts that provide interactive information to the users.

In an embodiment, host computer system 314, stores and executes an application program with which a user 318 is interacting via a display device 340, speakers 342, and a PID 312. For example the application program can be an operating system, a video game, or other application program that uses a force feedback device. Typically the host application program provides a visual display via a display device 340, as well as audio output via speakers 342, in addition to receiving input from and providing tactile sensation to the user 318 via the force feedback device 312. The information displayed may be referred to as entities, which are not real physical objects, but are software generated collections of data or procedures that may be displayed as images by the computer system 314 on display device 340, as is well known to those skilled in the art. For example, a simple cursor or a view of car on a race track, or an airplane in flight may be considered a user-controllable computer entity.

Speaker(s) 342 are coupled to the host computer 314 as is known by those skilled in the art. Host computer 314 while implementing an application program may output to the user 318 an audio event to enrich the user's interaction with the host-implemented application program.

The host computer system 314 preferably includes a processor 332, memory 334, storage 336, a system bus 338, speaker(s) 342, and a display device 340. The host processor 332 can include a variety of commercially available and well-known processors, such as processors from Intel, Motorola, or other equivalent manufacturers. Memory 334 can include read-only memory (ROM) and random access memory (RAM). The host computer retrieves an application program from storage 336, loads it into memory 334, and retrieves, stores and processes instructions and data while executing the application program as is well known to those skilled in the art. The host computer system receives sensor data from sensor 322 of the PID 312 via bus 316. The host computer system 314 can also transmit a force feedback command to the PID 312 via bus 316 to cause the playback of force feedback effects by the PID 312.

A PID 312 is coupled to the host computer system 314 via a bus 316. The bus 316 is preferably a low speed universal serial bus (USB). Alternately the PID 312 may interface with the host computer system via a serial port, a game port or a parallel port or other suitable input/output interfaces. An important feature of a preferred embodiment of the present invention is the use of a low speed USB interface, thus allowing for lower cost connectors, cables, and other associated hardware, as well as the general ease of use that comes with USB peripherals.

PID 312 is a peripheral device for host 314 that includes a user manipulatable object 320, a sensor 322, a local controller 324, local memory 326, other input means such as buttons 328 and actuator(s) 330 and their associated force transmission systems (not shown). An important feature of an embodiment of the present invention is the use of a low-cost controller limited to an 8-bit computational capacity as well as using a minimal amount of memory requiring less than 256 bytes. The embodiment shown on FIG. 3 provides a control loop between the controller 324, actuator(s) 330, object 320, sensor(s) 322 back to the controller 324, thus allowing certain force effects to be handled entirely local to the PID itself. Additionally, the host computer 314 is also included in an outer control loop to drive the PID 312. Typical actuators include motors, pneumatic/hydraulic actuators, magnetic devices, or other actuators that transmit a force. In one embodiment the user manipulatable object 320 is a joystick. In an alternate embodiment, the user manipulatable object 320 includes a steering wheel and hand and foot pedals. In yet another embodiment the user manipulatable object includes a gamepad and its housing. Moreover, the user manipulatable object can include a computer mouse. Typically, the actuators are coupled to the user manipulatable object through force transmission means as are known to those skilled in the art. Sensor(s) 322 senses the position, motion, and other characteristics of the user manipulated object 330 of the PID 312 along one or more degrees of freedom and provides this input to controller 324. Thus the user 318 may manipulate the object 320 of the PID 312 along one or more degrees of freedom to interface with the host application program the user is viewing on the display device 340. Other input means such as buttons 328 may also be used by the user 318 to provide other input signals to the host application program. Such input signals may include parameters to change a view of a game, or cause various other events to occur in a virtual environment as is generally known to those skilled in such arts.

In a preferred embodiment, a host-resident and host-driven device driver program receives high-level force feedback commands from an application program, manages, computes and translates them into a simplified set of commands and transmits those commands to PID 312 for playback via the local control loop. The details of the device driver program are described below.

II. Device Driver Software Description (A) Overview

The architecture of the device driver software program is strongly influenced by the hardware design specifications described above. The hardware design specification incorporates the use of a low-cost microcontroller with limited processing capabilities and a low-speed USB interface (compared to the high-speed processor on a high-speed USB link of prior art devices). These design decisions impact the interaction between the host and the device in several ways:

The low-speed USB interface only allows a transfer every 8 milliseconds. In between the transfers, the host has no way of influencing the device. Also, the low-speed USB link only allows short packets (up to 8 bytes, but practically limited by operating system "features" to 7 bytes). Prior art devices, connected with a high-speed USB link could theoretically be updated as much as every 1 millisecond. However, due to the massively higher on-device processing capabilities and autonomy of these devices, the update rates usually are set to 4 milliseconds.

The low-cost microcontroller has limited processing capabilities. It does not run as fast as conventional prior art force-feedback controllers. It has only 8 bit computation available for values, and it has a vastly reduced size of memory available, namely 256 bytes. This means that it can not store whole effect blocks like the more expensive prior art devices, and even if it could, it couldn't process them with the speeds required for the stable operation of the PID. For example, typical prior art force feedback devices require processor with a 16 bit computational capability and at least 1024 bytes of memory to store typical game effects.

The firmware defines a number of effects types that can be played. These effects look similar to the ones in DirectInput, but are considerably simplified. One embodiment of a current implementation of the devices according to the method of this invention is limited to a maximum of four simplified effects. In an embodiment including a joystick using a total of two motors, these effects are divided into two effects for each axis of the stick. In an alternate embodiment including a steering wheel using one motor, the device can actually handle four simplified effects at the same time for the single motor coupled to the wheel's axis. The device does not have any concept of time. It does not keep track of button assignments. It has no knowledge of the concept of envelopes as defined by DirectInput. Even the basic effects are limited in their ranges. In one embodiment, there is one "trapezoid force" which can be used to simulate periodic effects and its parameters can be set in fairly coarse increments.

Memory management is not necessary, as the device has fixed allotments for each of the 4 effect slots, due to the minimal amount of RAM of 24 bytes available for effects in the device. The device driver software program resides on the host computer and relies on the host's powerful processor to perform the majority of the effect management and computation, as well as translating all the complex high-level effect commands to a unique, small and simplified set of low-level commands for playback on the device.

As an aid to the description of the device driver software, a brief overview of the architecture and capabilities of DirectInput is provided herein. For a more detailed description, appropriate documentation from other sources such as Microsoft Corporation may be referred to.

(B) Architecture and Capabilities of DirectInput for Force Feedback Devices

As described above, the DirectInput API in Direct X has become a de facto standard API used for controlling PIDs in the Windows-based platforms. DirectInput defines a set of "effects", each of which has its specific parameters. Hardware vendors can add to the currently defined 12 standard DirectX effects, allowing game developers to take advantage of more specific device capabilities in the area of force-feedback. This approach is very flexible, however, is rarely used, since game developers don't want to limit their games to work on one particular device only, but on as many as possible. The standard effects defined by DirectInput are powerful enough to satisfy most needs, so there is hardly any use for vendor-defined effects. The currently defined "standard DirectInput forces" and their parameters are as described below, and can be split in two groups: Output only, and effects within a feedback loop. Output only effects are those force effects that are independent of the then current device object position, such at the "kick back" effect associated with the firing of a gun, and feedback loop effects are those force effects that are a function of the then current device object position such as the centering force which is applied to a steering wheel. The standard DirectInput forces are the following:

Constant Force: This is the simplest type of force. It represents a force vector with a direction and a magnitude, optionally with an envelope to modulate the force over time. The envelope effect is described below. The constant force effect is an output only effect.

Ramp Force: A ramp force is the second most simple force type. A ramp force is defined as a variable constant force. Instead of having a constant magnitude, it has a beginning and ending magnitude and performs a linear sweep between these two ends during the duration of the effect's playback time. As with the constant force, it has a direction and optionally an envelope. The ramp force effect is an output only effect.

Periodic: DirectInput defines a number of very similar effects, all of which belong to the group of the periodic effect type. These forces represent different periodical waveforms. All of them have the same parameters: frequency, phase, direction, magnitude, and optionally an envelope. The available waveforms are: square wave, sine wave, triangle wave, sawtooth up wave and sawtooth down wave. The periodic effect is an output only effect.

Custom Force: similar to the periodics, a custom force is a periodical waveform. In contrast to the regular periodics, a custom force does not have a predefined waveform; rather, the application defines how the waveform looks by specifying all relevant points on the curve, much like a sound sample. The custom force has the same parameters as a periodic. The custom force effect is an output only effect.

Springs: Spring forces apply a force which changes linearly in response to the deflection from a defined center point. The further away from the defined center the user pushes the gaming device, the stronger the force becomes. DirectInput allows for the definition of a spring center, the spring coefficient (how fast the spring force changes over a given deflection from the center) and a maximum level of force that should be allowed to be applied (clipping of the spring). Also, springs can be defined differently for either side of the center, and they can have negative coefficients, causing the spring to not resist, but support a deflection away from the center—the resulting effect would be similar to trying to balance a ball on an inverted bowl. Essentially, the effect represents the following formula: f=clip(k*x, max_force), where k is the coefficient (can be different for each side of the spring), x is the deflection from the center point, and clip is a function which limits the maximum force level. The spring force effect is utilized with a feedback loop.

Damper: A damper is much like a spring; the difference is, that it doesn't act on a deflection (distance) from a center, but on a difference in velocity from a reference point. All of the parameters are the same; the effect represents the formula f=clip(k*v, max_force), where k is the damper coefficient, v is the velocity (dx/dt, the first derivative of the distance traveled), and clip is a function which limits the maximum force level. The damper effect is utilized with a feedback loop.

Inertia: Again, inertia is very similar to the damper and spring, only that it acts on the acceleration of the controller. Also, all the parameters are the same; the effect represents the formula f=clip(k*a, max_force), where k is the inertia coefficient, a is the acceleration (dv/dt, the first derivative of velocity, or the second derivative of the distance traveled), and clip is a function which limits the maximum force level. The inertia effect is utilized with a feedback loop.

Friction: Friction is an effect, where a force gets played as soon as the joystick is moved. Even though it is physically different from a damper, the effects are rather similar, mostly because of the restricted range of motion. Oftentimes, the friction effect does get mapped onto a damper. The friction effect is utilized with a feedback loop.

Figure 4A:
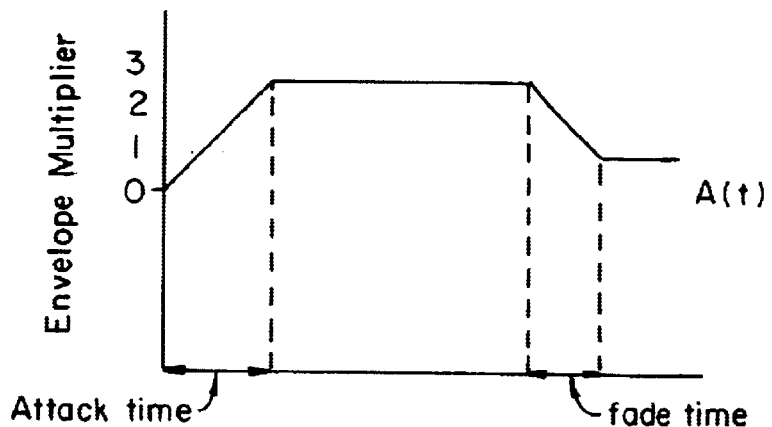
FIGS. 4A–4C illustrate the concept of the "envelope" as implemented in DirectInput.
Figure 4B:
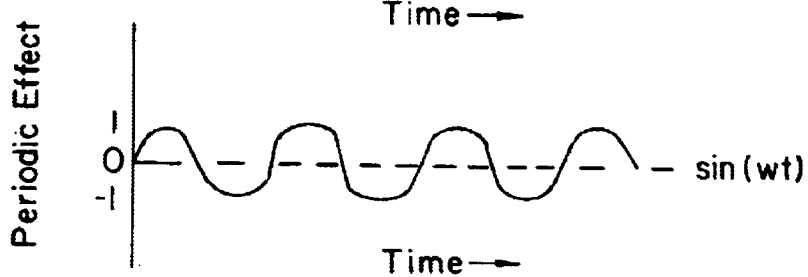
Figure 4C:
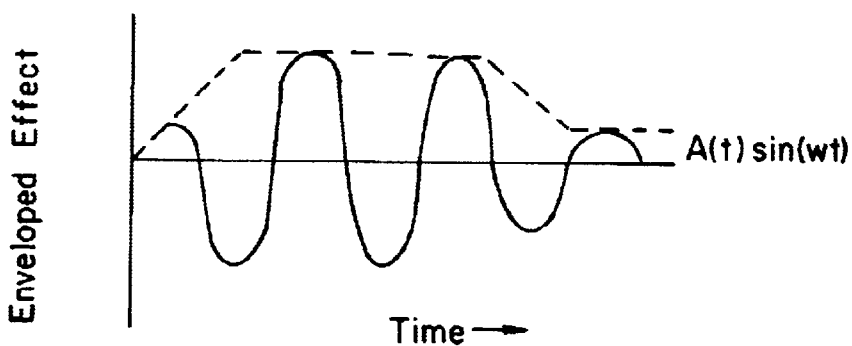

All effects share some common properties. They can be bound to buttons, meaning that they start playing when the button is pressed. They have a duration (which can be limited, or specified to be infinite, in which case they are played until explicitly stopped). The output-only effects support envelopes. An envelope specifies an attack time, a fade time, an attack level and a fade level. The envelope modulates the effect's magnitude, such that during the attack time, the magnitude changes from "attack level" a to "regular magnitude" m, then plays for the sustain duration, and then moves from "regular magnitude" m to "fade level" f during the fade time. The effect of the envelope can be best visualized by referring to FIGS. 4A–C. The envelope effect is essentially a time varying coefficient that is applied to any output-only effect. For example, the envelope of FIG. 4A when multiplying the periodic effect of FIG. 4B will result in the creation of the effect shown in FIG. 4C.

(C) Detailed Description of the Device Driver Software

As described above, a primary goal of an embodiment of the present invention is to move as much processing as necessary out of the device and onto the host, where a much greater processing (CPU) power is available. Due to limitations of the communication link between the device and the host, not all functionality can be moved. Some part of the computation has to take place on the device, or else the result would be sub-optimal. Sub-optimal results are either delayed effects or unstable effects that are rendered on the device as a result of a too lengthy of a communication loop from the device to the host and back.

Moving the processing out of the device and onto the host, creates the need of de-coupling the view the game gets from the device, because most games are not prepared to accommodate limited device capabilities. Many of games assume that a certain minimum of capabilities are present, namely the number of forces (which traditionally has been always 10 or more). If games see a device which presents only two or four effects, they don't try to adjust, but rather just disable force feedback for that particular controller. By virtualizing a device's capabilities by simulation on the host, the game gets to see a device with more features than it would be capable of supporting having only its firmware. This is achieved by creating a software object called a virtual device object. As described above, one of the features of an embodiment of the present invention is the combination of the facts that: (a) the device needs updating from the host to perform its operation, and (b) this updating cannot be given often enough to completely take over all its functionalities. Moreover, the use of a low-speed USB port will result in the transfer of position data from the device to the host and the updating of force output from the host to the device, to take at least 16 milliseconds, which is far to long for any effects which have a correlation between some positional parameter and the resulting force. Due to this bandwidth limitation imposed by the low-speed USB port, the device driver software program classifies the effects in the driver into two categories.

These two categories are handled differently by the device driver software. One of the categories is handled entirely by the host and the other is handled by a mixture of firmware and host software.

One category called "Native Effects" holds all effects that are of a closed loop nature. These force effects are dependent on the user manipulated object's position. Current examples of the operating system's API (DirectInput) effects are springs (force proportional to position), dampers (force proportional to velocity), inertia (force proportional to acceleration) and friction (force applied when movement takes place). These closed-loop forces are not suited for calculation on the host, since the latency of the round-trip in the loop causes severe instabilities in the resulting forces. Their calculation happens on the device, but is under constant, updating control of the driver.

The other category called "Simulated Effects" includes the remaining effects. These are of a "playback-only" nature, i.e., they are output-only and not dependent on the user manipulated object's position. Examples of such forces are the various wave forms (sine, triangle, square, etc.), and constant forces with their variations such as ramps. The latency introduced by the communication mechanism (typically 8 milliseconds over low-speed USB), though very easily measurable is not perceptible to the user.

The available space for effects in the device's memory is shared by the two pools of effects kept by the driver. In an embodiment including a joystick two effects are stored for each motor axes. In an alternate embodiment including a steering wheel four effects are stored. For the embodiments including a joystick, for a given axis one effect is being utilized for "Native Effects", the other for "Simulated Effects". For embodiments including a steering wheel, three on-device effects are used for "Native Effects", and one for "Simulated Effects". For embodiments using a gamepad, all the available space for effects in the device's memory is used for simulated effects.

For Native Effects, the ideal parameters passed down by the application program (game) are translated into a set of simplified effects by the device driver software and mapped into what the firmware can handle. Typically, this results in a drastic reduction of the resolution of the parameters. Part of the parameters are not being translated at all, but kept for the driver's own usage. This usually includes any kind of timing information, since the firmware does not keep track of time.

Simulated Effects hold their ideal parameters. On a regular basis, they are being asked about what their force output contribution is, as a result of which they will update their internal state, and advance to the next time pulse. Since they are handled by the driver running on a comparably very powerful processor, they retain their full "idealness", apart from scaling down the force vector range of the physical hardware.

Figure 5:
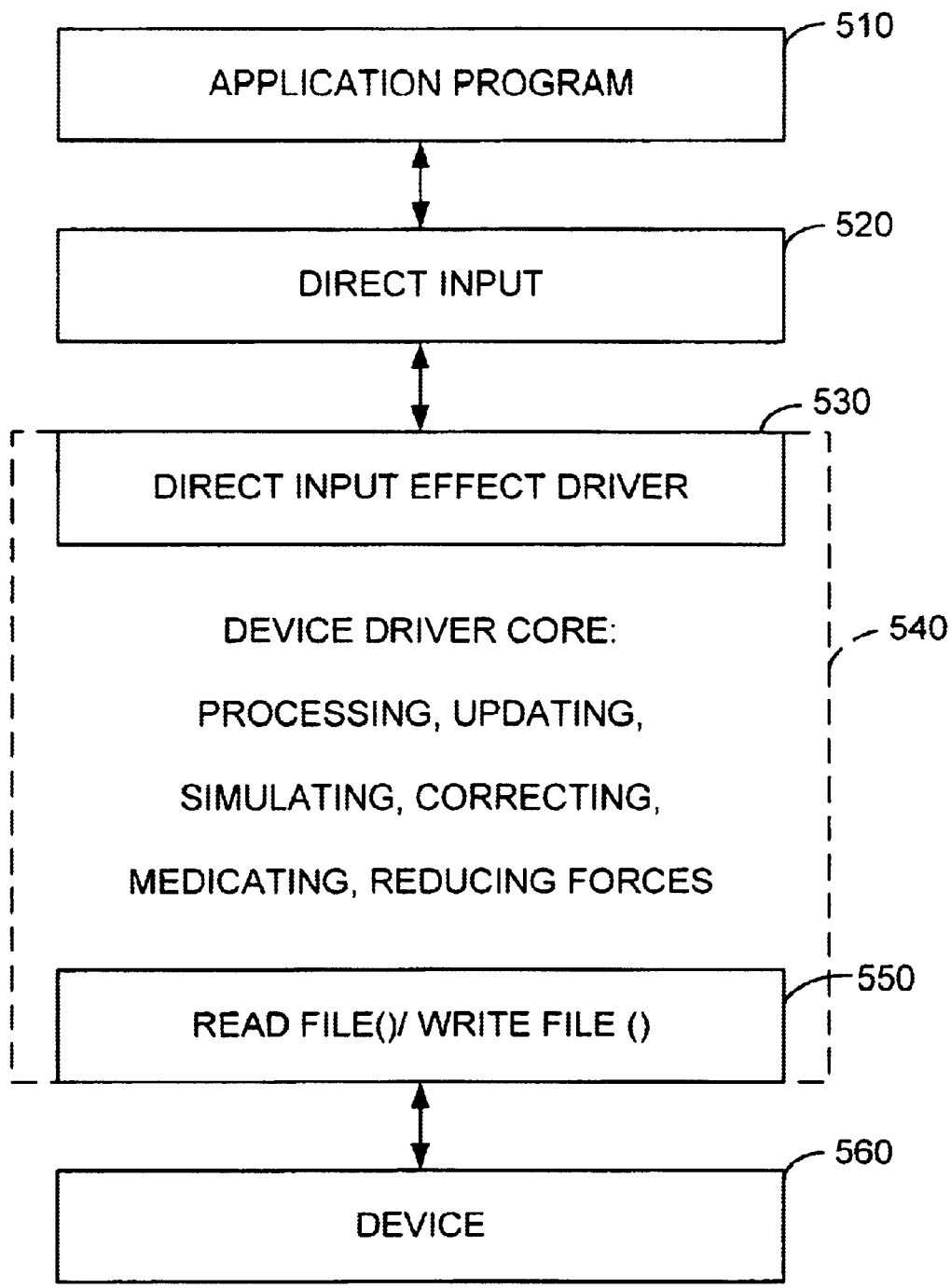
FIG. 5 is a conceptual block diagram showing the interface between an application program and a force feedback-enabled device according to an embodiment of the present invention.

FIG. 5 shows a conceptual diagram of the interface between the application program (game) and the force feedback-enabled device. As can be seen from this figure, driver 540 needs to interface both to the level above it, DirectInput 520, and its device 560. The interface to DirectInput is done in the only way possible and accepted by DirectInput, that is, by exposing an IDirectInputEffectDriver object 530. This object gets requested from DirectInput 520 when an application program (game) 510 wants to use force-feedback on the device, and through this object all commands get passed down to the device 560.

At the other end, the driver 540 interfaces to the device 560 by using standard methods for HID devices. HID collections appear as "device files" in the system and software (like the driver) can call the "CreateFile" function on those device files, and issue subsequent "ReadFile" and "WriteFile" functions to read data from or send data to the device, respectively. The method of WriteFile( ) function calls 550 is used to send commands to the device 560, after the driver 540 has decided what to send.

The device driver software core 540, which is in between these two interfaces 520 and 560, is the processing and decision making part of the device driver software. In order to support a whole family of devices based on the same approach, an object-oriented design was chosen. An embodiment of the software program is comprised of basic objects, which are common to all devices and derived objects that are specific to a particular device, such as a joystick, a steering wheel, a gamepad, or a computer mouse. These objects are created and destroyed on demand, as the dynamic operation of the application program and hence the driver commands. These object are described below. The description provided below is limited to devices including a joystick and a steering wheel. This limitation is not presented to limit the scope of the applicability of this invention to other possible force feedback-enabled devices, but merely as an illustration of the breadth of flexibility of this method for application to more than one type of device.

(i) Device Driver Software Program Portions

A first portion of the device driver software program ("driver") is the CFFServerClassFactory object. The interface between DirectInput and the driver is COM (Component Object Model) based. Part of COM requires that a COM provider like the driver must have a "class factory", which can produce COM objects of a given type. The driver has a basic server factory object, from which the specific class factories for the joystick and steering wheel devices are derived. Currently, there's a third class factory supported, which gives the value-added software (Profiler and Control Panel) access to some advanced features, which are not available by the standard DirectInput interface. These features include things like setting the level of forces, turning on/off and adjusting the centering spring for non-force games and the like.

DirectInput gets a class factory object to have an instance of the force feedback driver produced during its initialization. This object instance is used to communicate all requests from the application to the driver. For the value-added software, the same mechanism is utilized to gain access to the extended parameters.

A second portion of the driver is the CFFDrv object. The objects produced by the class factory are a derivative of this class. CFFDrv implements the interface, consisting of the commands required by DirectInput, which include DeviceID (to create/destroy an instance of a force feedback device), GetVersions (to query version information about hardware and driver), Escape (to allow vendor-specific commands to be sent to the driver), SetGain (to set the overall "volume" of the device), SendForceFeedbackCommand (to enable the game to perform a number of device operations, like turning on and off the actuators), GetForceFeedbackState (to allow the game to query whether the force feedback is turned on/of and the such), DownloadEffect (to download to or update an effect on the device), DestroyEffect (to remove an effect from the device), StartEffect (to start a previously downloaded effect), StopEffect (to stop a playing effect on the device), and GetEffectStatus (to inquire about the state of an effect, if it's playing or not). This interface is described in further detail in the DirectInput DDK (device developers kit), and is a requirement for a driver to be accepted as a force-feedback driver.

CFFDrv has two derived classes, CFFDrvWMjoystick for the joystick device and CFFDrvWMwheel for steering wheel device. They inherit the full functionality of their base class, the only difference being that they instantiate a different "Virtual Device," as described in the next object.

CFFDrv's functionality is very limited. All it does is look up the proper Virtual device and forward the request to that object.

A third portion of the driver program is the CVDevice. This class implements the concept of a "Virtual Device". It is the model of what is presented to DirectInput as the connected device, hiding the details of the underlying hardware. CVDevice handles all the requests coming from DirectInput. Most of the operations are rather trivial at this level, with the only sophisticated one being DownloadEffect. It contains a handle to a mutex (mutual exclusion) object to synchronize interfering operations. It keeps all the relevant information about the device, most importantly a handle to allow ReadFile( ) and WriteFile( ) operations. It also keeps a collection of effects. Every time the application requests a download or an update of a downloaded effect, CVDevice makes a copy of all the information. Start and Stop operations cause a flag to be set for the applicable effect; SendForceFeedbackCommand sets the state in the CVDevice. Analogously, GetStatus and GetEffectState can immediately return the status of the device or the state of any given effect at any time. At any given time, CVDevice knows about any and all effects, their parameters and their state, and about the overall status of the device.

At this point, there is no hardware involved. CVDevice simulates a perfect, infinitely capable device. An application sees a force-feedback device which does not reject any command or parameter range, even though there need not be any hardware connected at all. In a preferred embodiment, it allows a maximum of 64 effects to be downloaded, but simply changing a constant can change this. Other embodiments remove the restriction of a fixed number of effects by dynamically enlarging the "bag" of effects that CVDevice maintains.

In one embodiment, CVDevice has various derived classes. For example, one for a joystick and for a steering wheel device. These derivatives contain device-specific code. They inherit all the base objects properties, effect and device management, mutual exclusion through the critical paths, etc. What they add are two things—specialized handling of DownloadEffect, since this function requires some decisions to be taken in terms of effect types (described below), and a "Simulation Thread" handle. There is also some additional functionality, mostly pertaining to the additional features of every respective device including the handling of advanced parameters, handling of centering spring issues, handling of storing/retrieving configuration and discrete cases like shutting down or initializing the object.

The CVDevice derived classes, as part of their initialization, create a "Simulation Thread" object as described below. This thread is spun off as a separate processing unit to handle all the aspects of simulation in an as "real-time" as possible manner. This thread is a part of what makes the device come alive and be dynamic, optimally utilizing the limited resources.

A fourth portion of the driver program is the CEffect object. CEffect is the base for all effects. In its most basic form, it can keep and update information received from DirectInput about its properties. It can handle simple operations like Start and Stop, and it can update its internal state as a result of time passing by when it's told to do so. Start and Stop only change an internal flag; by looking at the total duration, a CEffect object knows that, when it's playing for long enough, it needs to stop. It performs this operation all without any interference from other controlling instances.

CEffect has several derived classes, which mostly encapsulate different effects' behaviors. For example, for the joystick embodiment there are two first-level derived classes, CNativejoystickEffect and CSimulatedjoystickEffect, representing "Native Effects" and "Simulated Effects". Alternately, the steering wheel embodiment has the same distinction. Each of those first-level derived classes has a number of derived classes of their own. The "Native Effects" have their respective CxSpringEffect and CxDamperEffect, where for example, "x" is either the joystick or the steering wheel. Some of the "Simulated Effects" have one level more of deriving—there's a CxPeriodicEffect, off of which CxSineEffect, CxSquareEffect, CxTriangleEffect, CxSawUpEffect and CxSawDownEffect are derived. Further, there is CxConstantEffect, CxRampEffect and CxCustomEffect derived off of CSimulatedxEffect.

All of the leaves in the object hierarchy have specific knowledge about what they are supposed to represent. A CxSawDownEffect, for example, knows exactly how to interpret the parameters in CEffect's copy of the original DirectInput effect structure to produce the sensation of a "sawtooth down" effect with all the given parameters like time, frequency, offset, envelope, etc. and can let another inquiring object know what the current force should be.

The objects derived from CNativeXEffect know what byte sequences to generate to be sent to the device so it will play a force, which is closest to what is being requested. Also, CNativeXEffect objects can give information about how "important" they are. This "importance" information is necessary for the prioritization of these effects into a subset of top "n" most important effects which are downloaded to the device.

A fifth portion of the driver program is the CSimThread object. This class implements the functionality of having a separate thread to perform all the necessary communication and computation. It is the glue between the "Virtual Device" represented by a CVDevice-derived object, and the real, physical hardware device. The "Simulation Thread" contains a continuously executed loop, which performs all the adjustments to effects caused by time passing; which arbitrates between multiple competing effects; which simulates everything that can be simulated, and which interacts with the device. This loop is started in the beginning and continues until the force feedback device is not needed anymore. In order to have the best possible real-time behavior, this thread is set to use a higher priority than regular application threads. This guarantees a timely scheduling on the multi-tasking operating system. It requires extreme care to not allow any tight loops, since the system will appear to come to a complete halt if high-priority threads don't hand off control appropriately. One of the core tasks of this thread, after all the simulation and arbitration has been performed, is to send the results to the device. Simulation as used herein is the computation of the vector sum of all simulated forces to arrive at one composite simulated force, and arbitration as used herein is the sorting of the native effects to determine the top (n) most important effects which are downloaded to the device. Calling WriteFile( ) causes the thread to be stalled, until the data is really sent. In this halted state, the operating system suspends the thread, and other system activity can take place unhindered. If, for any reason, the thread cannot or does not want to write to the device, it will perform a voluntary Sleep for 8 milliseconds, during which the system will resume to normal speed.

CSimThread has at least two derived classes, again, CjoystickSimThread and CwheelSimThread. These two classes implement device-specific behavior and contain device dependencies, like the transfer size and format for their represented hardware devices.

CjoystickSimThread and CwheelSimThread also know exactly about the device's capabilities and limitations, and perform sorting and arbitration of effects. In both cases, they go through their Virtual Device's list of effects, update them with the current time, and then act on the results. For CxSimulatedEffect objects, the thread sums up all the force vectors, which yields the final sum of all simulated effects. If this value has changed from the last update, the device will be updated by sending it this value. For CxNativeEffect objects, the thread inquires all effects about their importance, and sorts them by most important first. After this sorting has been done, the device is updated with the current state of the effect(s). It is up to the effects to judge their own importance, but various typical embodiments include using a combination of coefficients, clipping level and duration to assist in judging the importance of each effect.

The simulation thread object also checks for button presses, and if forces are registered for certain buttons, it will prompt those to start playing, just as if the application program or game had commanded them to start playing. It will handle all necessary steps to stop them when the trigger is released (if the effect's duration is infinite), or let them stop on their own (if the duration is finite).

In addition to the driver program portions described above, there are also a few helper classes, which offer support for often-used functionality. Besides these, there are other sundry classes related to configuring advanced features of a force-feedback device. All the helper classes provide access to parameters through bypassing the official DirectInput interface.

The most important helper class is CTiming. CTiming provides precise timing services. This is a very important aspect, since the entire simulation relies on accurate timing information, outputting real-time data to the device. Usually, applications can get times with a resolution of 1 millisecond, however such a resolution does not mean that it's precise to one millisecond. Through the typical interface of getting time from Windows (GetTickCount( )), the time gets updated every few milliseconds. This can be as little as two or three milliseconds, but can go as high as 30 milliseconds at times. Fortunately, the multimedia API of Windows provides the timeXXX functions, which allow precision timing down to one millisecond. Dealing with this API, although not difficult, requires a few extra steps. These extra steps are all hidden in CTiming, which provides additional functionality like calculating differences between two different CTiming objects.

Although the description of the portions of the device driver software program provided above hinted at its execution, a more in-depth description of its dynamic operation is provided below.

(ii) Dynamic Behavior of the Device Driver Software Program

Figure 10:
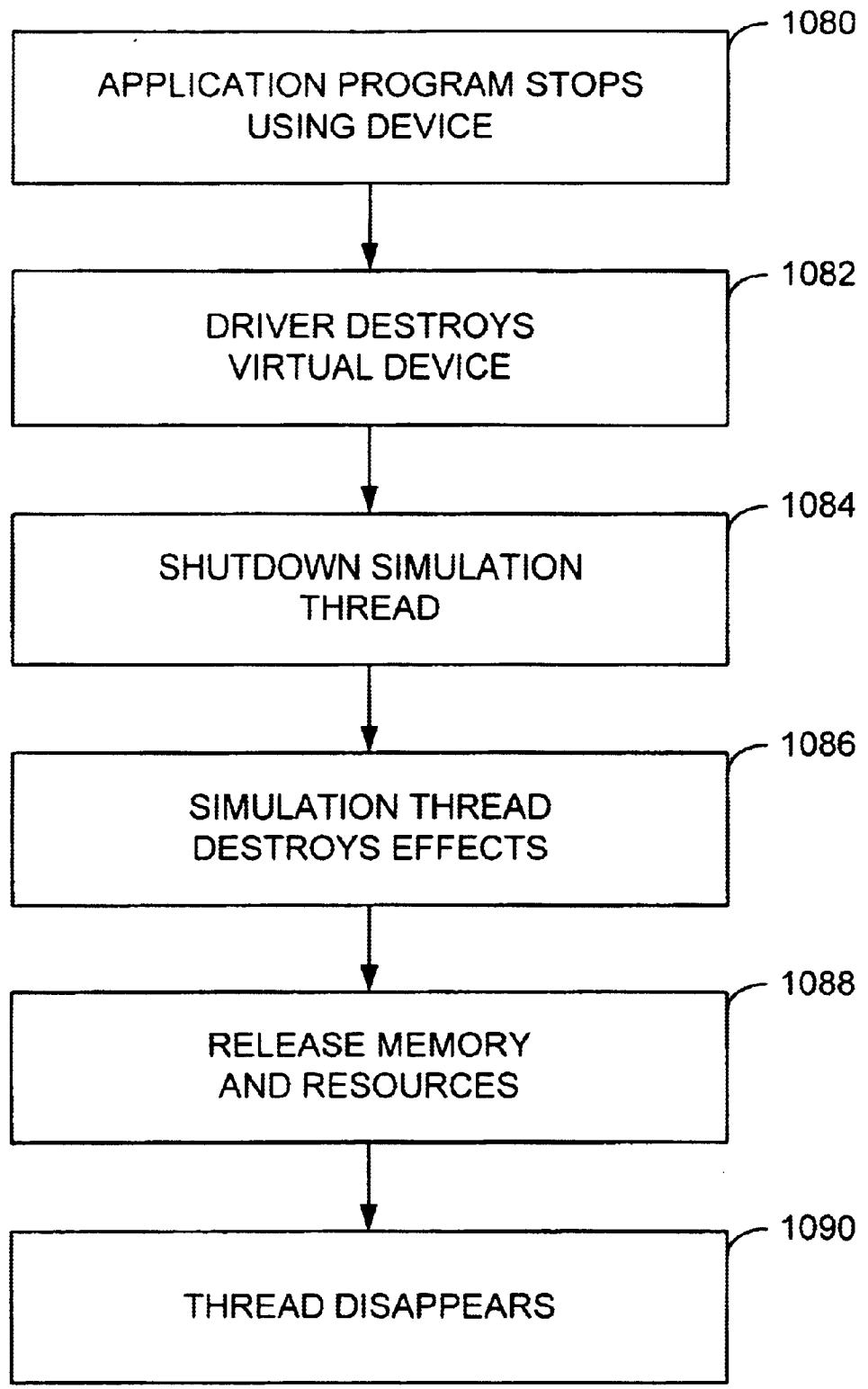
FIG. 10 is a flow diagram of an embodiment of the shutdown operation of the device driver software program.

As described above, the device driver software program can be implemented with various force feedback-enabled devices. In order to avoid an overly general description of the dynamic operation of the device driver software program, an embodiment including a steering wheel device is chosen to exemplify the process. The description below is not intended to be limited to such a device, since this description is equally relevant to other embodiments such as a joystick, gamepads, other peripherals and the like. The dynamic behavior includes the following three phases: Initialization, Running Operation, and Shutdown. The first phase takes place at first, when an application indicates to DirectInput that it wants to use this force-feedback device. After all the initialization is done, all the pieces are connected and in a running condition, and the second phase is entered. This second phase is where most time is spent, and where most of the operations are performed. Once the application exits, the last phase is entered, where all processes are shut down and released. Each of the different phases of the running operation are described in further detail below and corresponding FIGS. 6, 7 and 10.

(a) Initialization

When an application indicates to DirectInput that it wants to use a device in force-feedback mode, Directinput takes a few steps to ensure the device is available and can be talked to. In terms of implementing the driver, it's left up to the hardware manufacturer to choose between a ring 0 (kernel mode) driver, or a ring 3 (user mode) DLL. The kernel mode approach is only supported under the Windows 9x (95, 98, Millennium) architecture, so it is desirable to use the user mode DLL model for future compatibility with Windows 2000 and beyond. Since the force-feedback driver is implemented as a COM provider (one of the two supported ways under Windows 9x, and the only valid way under Windows 2000), these initial steps are essentially governed by the behavior of COM objects.

Figure 6:
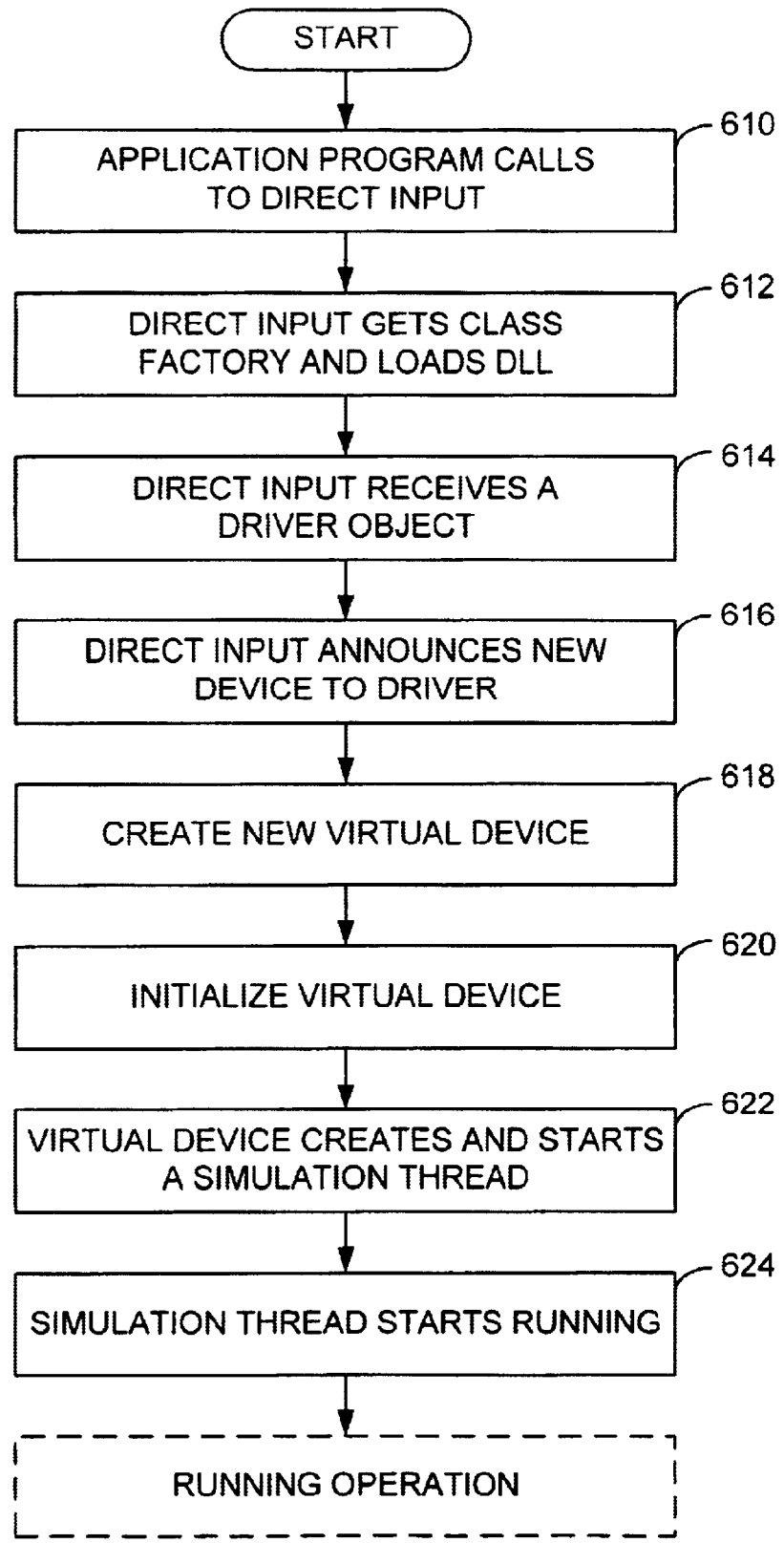
FIG. 6 is a flow diagram of an embodiment of the initialization operation of the device driver software program.

FIG. 6 is a flow diagram showing the initialization phase of the running operation of the driver. At the first step (step 610), by starting to call force-feedback-related functions in DirectInput, the application states its interest in force-feedback. DirectInput, as a result, looks up which CLSID GUID (CLaSs ID/Globally Unique Identifier) is registered to handle the device. Then, it looks up which DLL is associated with that CLSID, loads the DLL (step 612), and gets its class object—the class factory. This is all part of the standard COM procedure for loading a COM provider DLL. Next, having obtained the class factory, the program requests the class factory to produce an object derived from IDirectInputEffectDriver, as a result of which it will receive a force-feedback driver object (step 614). The next step for DirectInput to perform is the announcement of a new device to the driver (step 616). Essentially, DirectInput tells the driver, "from now on, you should handle the device on IDx". This causes the force-feedback driver object to create a new instance of a Virtual Device of the appropriate type (step 618). The newly created Virtual Device's Initialize function is called to let it initialize whatever it requires (step 620). This initialization function performs all necessary setup steps: It figures out the path to the device, opens that path for subsequent sending of force commands to the device, looks up the previously used advanced parameters, creates and starts a Simulation Thread (step 622). The Simulation Thread in turn sets up its internal state and starts running (step 624). Since, at this point, there is nothing to process, the thread essentially loops doing nothing, while pausing in between.

At this point, all objects and resources are set up properly in such a way that the application can start downloading/playing/modifying/stopping forces. The Simulation Thread is running and functional, the virtual device is initialized and empty. The next phase in the dynamic operation of the device driver software is the running phase. The running phase is described below and on FIG. 7.

(b) Running Operation

Figure 7:
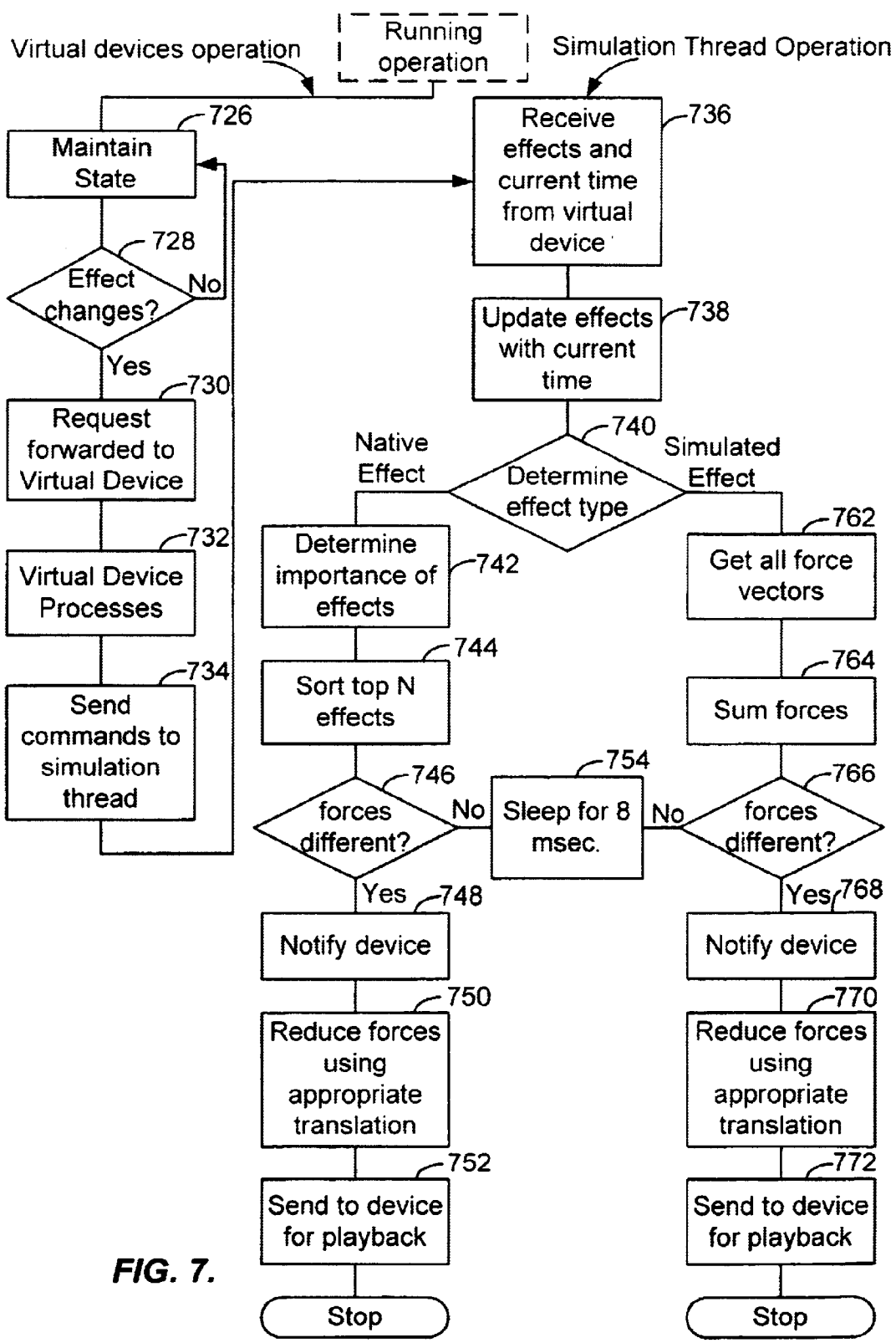
FIG. 7 is a flow diagram of an embodiment of the running operation of the device driver software program.

FIG. 7 shows a flow diagram of the running operation phase of the device driver software program. The running operation is further divided into two parts. The first part includes the Virtual Device object, interfacing with DirectInput. The second part includes the Simulation Thread object, performing various processes in its own thread, while decoupled from the application.

(b)-1 Virtual Device Object Operations

As described above, the virtual device was created during the initialization (step 618) and it represents an ideal or perfect device which is presented to the application program and is infinitely capable of performing all requested feedback effects. Initially the virtual device object merely maintains its state (step 726) until a request for force feedback changes is received from the application program (step 728). There can be any sequence of the supported functions (Download (or Change) Effect, Destroy Effect, Start Effect, Stop Effect, Get Effect State, Send FF Command, Get Device Status, Set Overall Gain), which DirectInput receives from the application program and passes on to the driver. The force feedback driver, in turn, forwards those requests to the Virtual Device responsible for the device ID specified in the request (step 730) and allows it to address any device-specific parameters, and if required, returning the Virtual Device's error code. The Virtual Device is where the requests are being processed (step 732). None of these requests require any significant amount of processing time and return immediately after they show their effect. Once the virtual device has processed these requests, it forwards them to the simulation thread (step 734) for translation to low-level commands and subsequent communication to the physical device. Examples of some the single operations that may be performed at this level (step 732), and their corresponding results are shown below:

Download Effect: This function can be called under two circumstances: Either the application wants to download a force for the first time, or it wants to update a previously downloaded force. The Virtual Device decides which path to take based on the handle passed from the application, which is 0 if a new effect is created, or some other number if an effect is to be modified. If a new effect is to be created, the Virtual Device picks the appropriate one from the collection of known effect objects, e.g., a sine function force for a steering wheel device. The virtual device registers it as the one to handle the specified effect, and treats the effect accordingly to initialize it. Typically, this includes calling the effect's Update( ) function once to let it know what parameters it should carry and to let it initialize itself. For some effects, additional initialization is required and performed at this point. If an existing effect is to be modified, the Virtual Device selects the specified effect and calls its Update( ) function, as a result of which the effect updates its copy of the DirectInput parameters.

Destroy Effect: When an application does not want to use an effect anymore, it calls the DestroyEffect to get rid of it and remove it from the device it's dealing with. In the device driver, the Virtual Device simply calls the effect object's destructor function. The effect decides what needs to be done; all effects release the memory they used, and some effects do additional work, like stopping themselves on the device if they are active Native Effects.

Start Effect/Stop Effect: These two calls get forwarded immediately to the appropriate effect objects. The effect object in question updates its internal state to playing/not playing and performs any necessary additional initialization.

Get Effect State: The Virtual Device forwards these calls directly to the effect object concerned. The only thing the effect object does as a result is to return a copy of its internal IsPlaying flag.

SendFFCommand: This function is directed towards the device, and not a specific effect. Therefore, it gets handled by the Virtual Device object itself. Some of the possible commands have a more significant impact (like RESET, which causes the Virtual Device object to stop and destroy all effect objects, or STOPALL, which causes it to iterate over all effect objects and call their Stop functions), some of them have a less significant impact (like ACTUATORS_ON or .._OFF). For all commands, the Virtual Device object's internal state gets updated, and in some cases there are some operations performed. Turning on or off the actuators, for example, can cause the Virtual Device object to send out a command to disable/re-enable the centering spring, if the user chose to do so through the advanced options.

Get Device Status: Again, this command is directed towards the device itself and therefore gets handled by the Virtual Device object. In this case, the only operation performed is returning the internal state (actuators on or off, device empty or full, device stopped).

Set Overall Gain: The last device-overall function doesn't do anything except store the requested overall gain. This value gets tied into the calculations done by the simulation thread.

(b)-2 Simulation Thread Object Operations

As described above, the Virtual Device object, along with all its associated objects like effects, showed a close link to the applications behavior. This is by design, since the application program should be presented with a device which is as close to an ideal one as possible in an effort to support maximum compatibility with games, as well as maximum fidelity and adaptability to new or modified hardware scenarios in the future. On the other end, the real device needs to be updated with information and instructions on what to do. The Simulation Thread object handles all the details related to the translation from the ideal device to the real-world device, with significant help from the effects themselves.

The core competency of what ends up playing on the device lies in the effect objects, since the effects objects know best what should play at any given time, and how to get from the ideal representation to the device's capabilities.

The thread brings in the dynamic behavior and simulation to enable more than what the hardware could do on its own. For example, it commands the clock, which is the constant update to the device to keep it properly interfaced, and it arbitrates between competing effect objects.

All these decisions are taken on the basis of what the application has told the Virtual Device object to do, and how to do it. The Virtual Device accepts and stores the information, the Simulation Thread evaluates and uses that same information to create physical sensations. As such, the thread does not have any concept of DirectInput or an application program talking to it. All the simulation thread knows is that it has received several effects (step 736), it knows the current time (step 738), and it must process this information.

In each loop, which happens roughly every 8 milliseconds and which is commanded by the transfer rate on the USB link, the Simulation Thread object determines whether it is working with a Native or a Simulated effects (step 740). If it is processing Native Effects, the Simulation Thread asks all "Native Effects" for their importance (step 742). Every Native Effect can judge how strong (perceptible) it feels. The Simulation Thread keeps track of all involved Native Effects and their importance, and sorts the results by most important one (step 744). In one embodiment the sorting is achieved based on perceived strength of effects; for springs, their spring coefficients and their clipping values get summed up in a weighted manner to present an overall "strength"; for dampers, a similar calculation takes place, where the damper coefficients get a higher weight. Other criteria, like the distance of the spring's center from the joystick's physical center, or the deadband between the left and right hand side of the spring, can be factored into the equation as well. The Simulation Thread then determines to see if these top-N forces are different from the last update (step 746). If these top-N forces are different from last time round, the device gets notified accordingly (step 748), the effects get asked for their commands to the device, the Simulation Thread then determines an appropriate translation or reduction of the forces-(step 750) and the device gets updated with the currently most important forces (step 752). This implies that the device will always get filled with the N most important forces, effectively implementing a swapping mechanism, which drops less important forces. This is an especially important feature for the joystick embodiment, which has only one force available for Native Effects per each actuator. If, on the other hand, no update to the device is required, for example, because nothing changed, the Simulation Thread goes to sleep for 8 milliseconds (step 754) to back off and let other threads gain attention from the CPU.

If the Simulation Thread is processing Simulated Effects, it will ask all "Simulated Effects" for their force vector (step 762). By summing up these vectors (step 764), one resulting vector appears as a composite force—very much similar to adding multiple sound sources together in a mixer. The Simulation Thread next determines whether the resulting force vector is different from the last update (step 766). If the resulting force vector is different, the thread notifies the device of the change (step 768), determines an appropriate translation (step 770) and sends the translated force to the device for playback (step 772). This resulting vector can be played as one on-device constant force, just like the output of a mixer can be played on one single speaker. If, on the other hand, no update to the device is required, for example, because nothing changed, the thread goes to sleep for 8 milliseconds (step 754) to back off and let other threads gain attention from the CPU.

As an added benefit, the driver has the ability to modify certain parameters on the way from the game to the device. Most important parameters here are the force magnitudes. Due to the mechanical construction, the device may have a non-linear response to forces. Typically, the forces of lower magnitude may get swallowed by the mechanism, and high magnitude forces (especially springs) will cancel out other playing forces. Since the simulated forces are under complete control of the host, the driver implements a mechanism to linearly attenuate them (if they are desired to be weaker), or applies a non-linear transformation (gamma curve) to their values. This causes a good correction of the mechanism's deficiencies. For Native Effects, the driver simply attenuates/amplifies their parameters; for springs specifically it limits the maximum strength to allow for some headroom for other effects, even if a strong spring is played.

Figure 8:
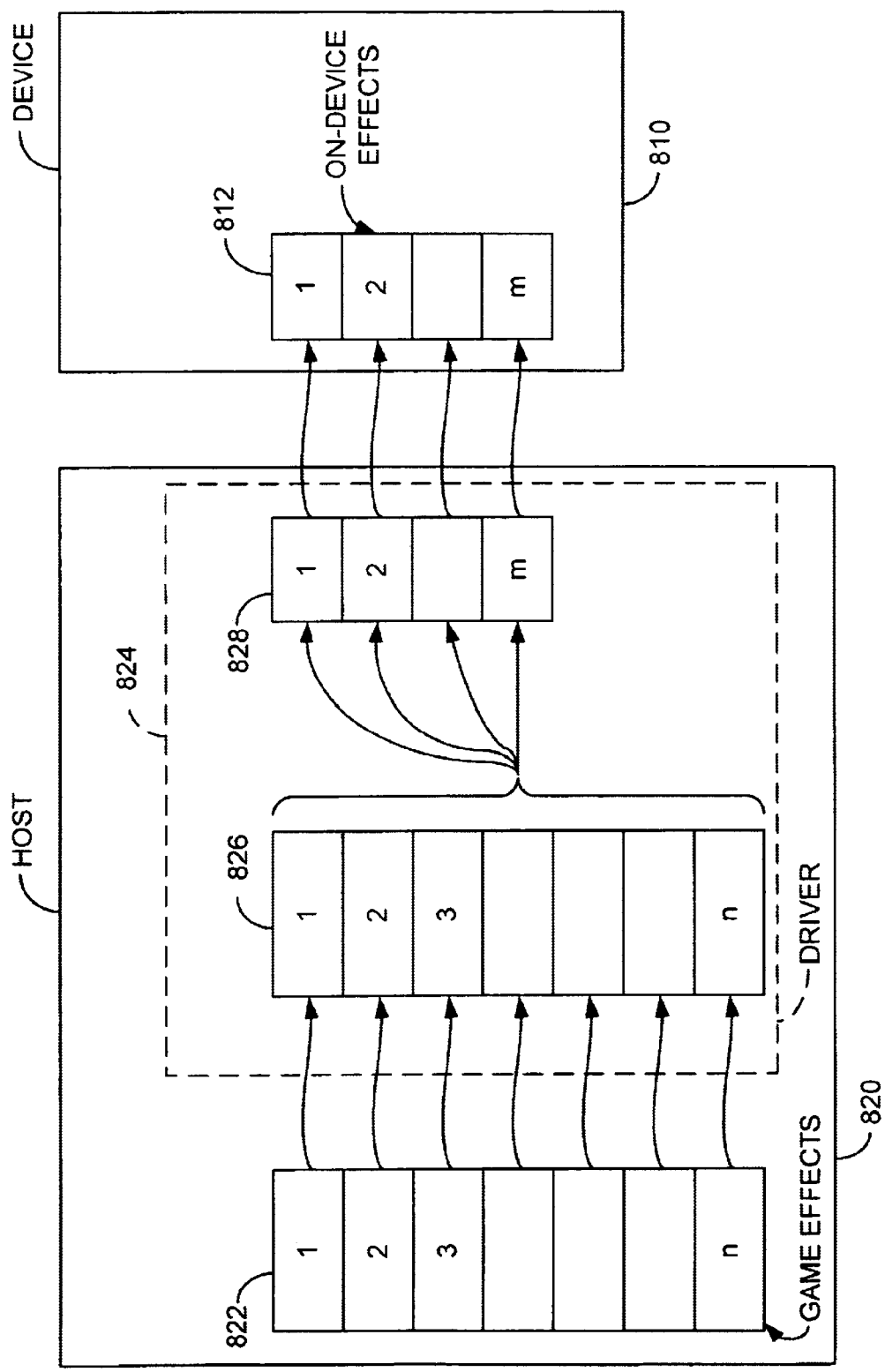
FIG. 8 is a conceptual block diagram showing the correspondence between game effects and on-device effects according to an embodiment of the present invention.

FIG. 8 is a conceptual block diagram showing the correspondence between game effects and on-device effects during the initialization and the running operation of an embodiment of the present invention. Upon initialization, the game (not shown) queries the device 810 for all possible effects 822, the device driver software program 824 creates the Virtual Device to store the application program effects 822 as Virtual Device effects 826, thus resulting in a 1-to-1 correspondence between the game and the on-Virtual-Device effects. The device driver software program, acting through its various portions described above, will then decide which effects are simulated effects and which are native. As described above, all simulated effects are summed to arrive at their resulting force vector. The resulting force vector is then translated to an appropriate simplified effect and mapped as one of the simplified effects that are sent to the device. The native forces are prioritized and the top n–1 effects are translated to appropriate simplified effects and the final subset of n(1 simulated and plus [n–1] native effects) simplified effects are sent to the device as on-device forces 812.

Figure 9:
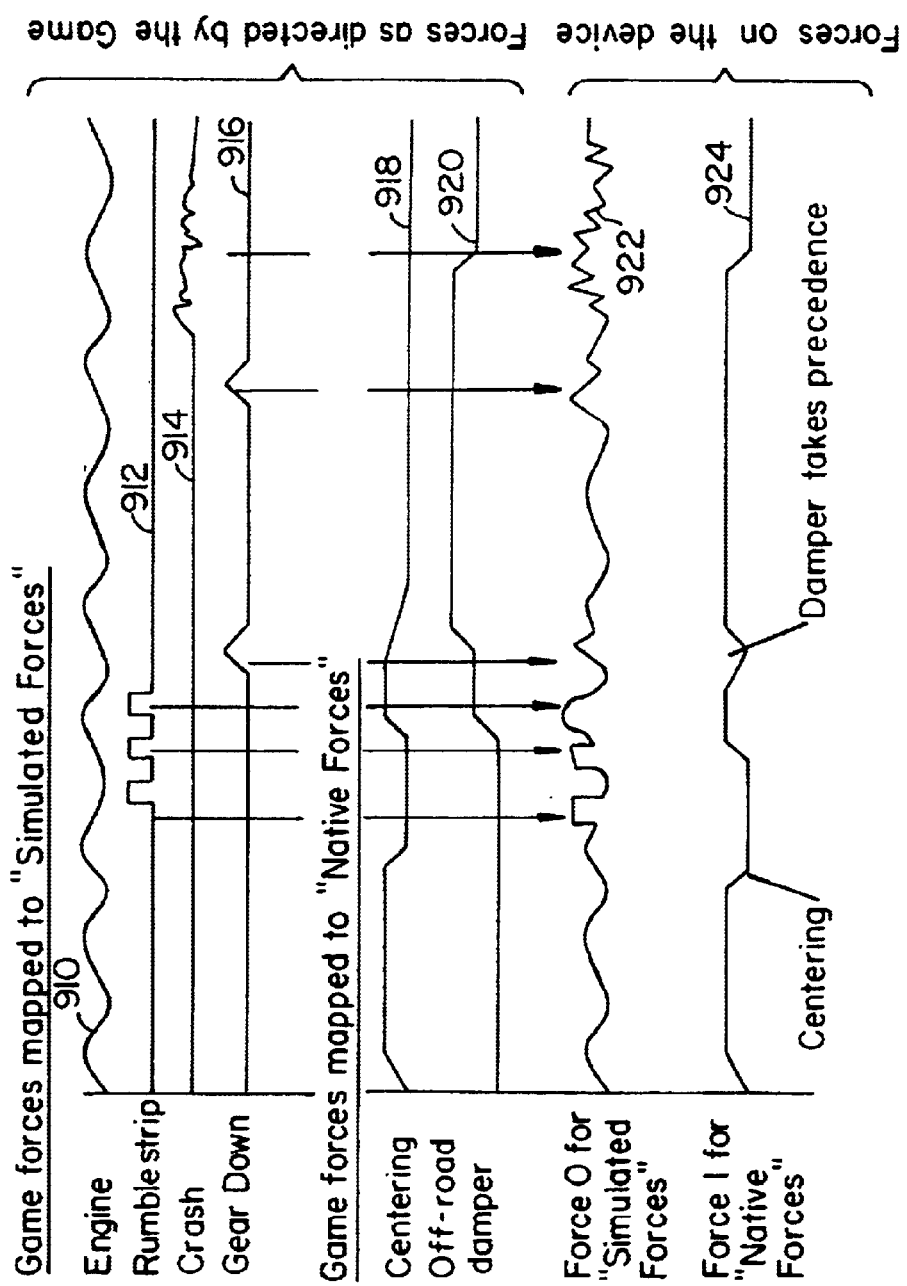
FIG. 9 is a diagram of the dynamic behavior of an embodiment of the present invention in a typical car racing game.

FIG. 9 shows an example of the dynamic behavior of the device driver software program in an embodiment using a joystick where the subset of on-device stored effects includes only two effects consisting of one simulated and one native effect. This figure shows that the game is providing a total of six effects to be played back by the device. These include the engine force 910, the rumble strip 912, the crash effect 914, the geardown effect 916 which are all simulated-type forces and the centering effect 918 and the off-road damper effect 820 which are native-type forces. These forces are a function of time and the device is requested to play all of them simultaneously. The device driver software program will sum up all the simulated forces to determine a resulting vector force as represented by the "Simulated Forces" trace 922. Since the device has no concept of time, what is actually downloaded to the one available simulated force slot on the device is a series a discrete constant force values which when summed up correspond to the on-device simulated trace 922. The device is uploaded with these discrete values at the rate corresponding to the communications transfer rate of the host to the device, which is governed by the low-speed USB protocol.

The native effects are examined for their importance as a function of time by the device driver software program. Here, since the device has one slot for one native on-device effect, the driver program determines which of the two game effects representing a centering spring force 918 and a off-road damper force 920 is more important during each time period, and based on this information generates one composite native effect. Here, by judging the importance of the two game forces mapped to the native effects, the driver program generates the resulting on-device native force effect profile 924. This native force is comprised of portions represented by the simplified spring and damper effects which are appropriately downloaded for each time increment for processing and playback by the device. The last phase of the dynamic operation of the device driver is the shutdown operation, which is described below.

(c) Shutdown Operations

In order for the driver and the device to be system-friendly, it is required that applications terminate all threads they started and release all the resources such as memory, mutexes, etc. that they allocated during their initialization and/or running time, thus terminating cleanly. As shown on FIG. 10, once an application program stops using the force feedback device (step 1080), the force-feedback driver object takes care of termination by destroying in its destructor all Virtual Device objects it created (step 1082). The Virtual Device objects in turn, in their destructor, ask the Simulation Thread object to shut down (step 1084). Another part of this destruction process is done by iterating through all effects and destroying them.

When the Simulation Thread object is asked to shut down, it signals the Simulation Thread to terminate and hence destroy all effects (step 1086), waits for the Simulation Thread to finish the current step, then releases all associated resources (step 1088) and disappears (step 1090). In turn, the effects, when asked to destroy themselves, release all resources (mostly memory) associated with them and disappear.

As will be understood by those skilled in the art, other equivalent or alternative methods for processing force feedback effects by a host-based device driver software program for playback on a force feedback-enabled device according to the embodiments of the present invention can be envisioned without departing from the essential characteristics thereof. For example, numerous combinations of components may be used in the PID such as the controller, memory, sensors and buttons to allow it to interface with a host-resident application program and the device driver software program. Moreover, the choice of the programming language or the architecture of the device driver software program can also be varied while keeping its produced result essentially the same. These equivalents and alternatives along with obvious changes and modifications are intended to be included within the scope of the present invention. Accordingly, the foregoing disclosure is intended to be illustrative, but not limiting, of the scope of the invention which is set forth in the following claims.

What is claimed is:

1. A system for processing force feedback effect commands generated at a host computer by an application program, said system comprising:

(a) a physical interaction device for playing back said effects, said device being coupled to said host and configured to receive information and said force feedback effect commands and to provide information and input signals to said host for incorporation into said host application program, said device comprising:

a controller configured to receive command signals from said host, wherein said controller includes a programmable digital memory, at least one actuator coupled to said controller and configured to receive control signals from said controller and cause a physical movement in response to said control signals, an operator manipulated component movable by an operator in at least one degree-of-freedom, and connected to and movable by said at least one actuator, and an input device coupled to said controller and configured to provide input signals to said controller, where said input signal is provided to said host by said controller for incorporation into said host application program, and (b) a computer program product comprising:
  a computer usable medium having computer readable code embodied therein for causing the processing of said force feedback effect commands for playback on said physical interaction device, said computer program product comprising:
    a computer readable program code device configured to cause a host computer to effect the initialization of said computer program when said host calls to state an intent to use said device, where said initialization creates a virtual device object, and where said virtual device object creates and initializes a simulation thread object, where said host application program is solely cognizant of the presence of said virtual device,
    a computer readable program code device configured to cause a host computer to effect the running operation of said computer program, where said running operation comprises:
      the running operation of said virtual device object, where said running operation of said virtual device object is closely related to said host application program's behavior and timing, and said virtual device object receives high-level force feedback effect commands from said host application program, and
      the running operation of said simulation thread object, where said running operation of said simulation thread object is decoupled from said host's application program, and where said simulation thread object receives high-level force feedback effect commands from said virtual device object and
      classifies said high-level force feedback effect commands into a simulated effects and native effects categories, where simulated effects are effects which are independent of the response of said device, and native effects are force effects which are dependent on the input and response of said device, and where said native effects are locally processed by said device, and where said simulated effects are processed by said host,
      translates said high-level force feedback effect commands into a set of simplified effects, where said simplified effects include both simulated and native effects, and
      periodically updates said physical interaction device by transferring to it a subset of said simplified effects comprising (n) simplified effects for on-device storage and playback, which comprise at least one simulated effect and as many as (n−1) native effects, and where said at least one transferred simulated effect is a vector sum of all application program simulated effects computed by said device driver software program, and where said (n−1) transferred native effects are the (n−1) top prioritized native effects selected by said device driver software program, and where said periodic updates implement a swapping operation of the highest (n−1) top rated native forces.

2. The physical interaction device of the system of claim 1 further comprising a sensor coupled to said operator manipulated component and configured to sense a position of said operator manipulated component, said sensor generating a position signal that is input to said controller and being indicative of the position of said operator manipulated component.

3. The system of claim 1, where said physical interaction device is coupled to said host via a low-speed USB interface allowing transfers of information between said host and said physical interaction device at a periodic rate, and where in-between said transfers said physical interaction device is autonomous and where in-between said transfers said host does not influence said physical interaction device.

4. The system of claim 1, where all application program force feedback effect types are stored on said virtual device using storage means on said host computer, and not on said physical interaction device.

5. The system of claim 1, where said physical integration device comprises a joystick.

6. The system of claim 1, where said physical interaction device comprises a steering wheel.

7. The system of claim 1, where said physical interaction device comprises a game pad.

8. The system of claim 1, where said physical interaction device comprises a computer mouse.

9. A physical interaction device ("PID") for playing back force feedback effect commands generated at a host computer by an application program, said device being coupled to said host and configured to receive information and said force feedback effect commands and to provide information and input signals to said host for incorporation into said host application program, said device comprising:
  a controller configured to receive command signals from said host, wherein said controller includes a programmable digital memory,
  at least one actuator coupled to said controller and configured to receive control signals from said controller and cause a physical movement in response to said control signals,
  an operator manipulated component movable by an operator in at least one degree-of-freedom, and connected to said at least one actuator,
  an input device coupled to said controller and configured to provide input signals to said controller, where said input signal is provided to said host by said controller for incorporation into said host application program, and
  said physical interaction device configured to be periodically updated with a subset of simplified force feedback effects translated from high-level force feedback effects generated by said application program by a computer program product resident and running on said host which performs all force feedback effect storage, management, translation to said simplified effects, and the selection of said subset of simplified effects.

10. The PID of claim 9 further comprising a sensor coupled to said operator manipulated component and configured to sense a position of said operator manipulated component, said sensor generating a position signal that is input to said controller and being indicative of the position of said operator manipulated component.

11. The PID of claim 9, where said physical interaction device is coupled to said host via a low-speed USB interface allowing transfers of information between said host and said physical interaction device at a periodic rate, and where in-between said transfers said physical interaction device is autonomous and where in-between said transfers said host does not influence said physical interaction device.

12. The PID of claim 9, where all application program force feedback effect types are stored using storage means on sad host computer, and not on said physical interaction device.

13. The PID of claim 9, where said physical interaction device comprises a joystick.

14. The PID of claim 9, where said physical interaction device comprises a steering wheel.

15. The PID of claim 9, where said physical interaction device comprises a game pad.

16. The PID of claim 9, where said physical interaction device comprises a computer mouse.

17. A computer program product comprising:

a computer usable medium having computer readable code embodied therein for causing the processing of force feedback effect commands issued at a host computer by an application program for playback on a physical interaction device ("PID)"), said computer program product comprising:

a computer readable program code device configured to cause a host computer to effect the initialization of said computer program when said host calls to state an intent to use said device, where said initialization creates a virtual device object, and where said virtual device object creates and initializes a simulation thread object, where said host application program is solely cognizant of the presence of said virtual device, a computer readable program code device configured to cause a host computer to effect the running operation of said computer program, where said running operation comprises:

the running operation of said virtual device object, where said running operation of said virtual device object is closely related to said host application program's behavior and timing, and said virtual device object receives high-level force feedback effect commands from said host application program, and the running operation of said simulation thread object, where said running operation of said simulation thread object is decoupled from said host's application program, and where said simulation thread object receives high-level force feedback effect commands from said virtual device object, and classifies said high-level force feedback effect commands into a simulated effects and native effects categories, where simulated effects are effects which are independent of the response of said device, and native effects are force effects which are dependent on the input and response of said device, and where said native effects are locally processed by said device, and where said simulated effects are processed by said host, translates said high-level force feedback effect commands into a set of simplified effects, where said simplified effects include both simulated and native effects, and periodically updates said physical interaction device by transferring to it a subset of said plurality of simplified effects comprising (n) simplified effects for on-device storage and playback, which comprise at least one simulated effect and as many as (n–1) native effects, and where said at least one transferred simulated effect is a vector sum of all application program simulated effects computed by said device driver software program, and where said (n–1) transferred native effects are the (n–1) top prioritized native effects selected by said device driver software program, and where said periodic updates implement a swapping operation of the highest (n–1) top rated native forces.

18. The computer program product of claim 17, further causing the storage of all application program force feedback effect types issuable by said application program on said host computer.

19. A force feedback apparatus comprising:

a device having a force feedback actuator and a memory for storing force feedback effects;

a software driver for installing on a host device computer to interact with an application program running on sad host device; and said software driver containing code for translating high-level feedback effect commands into a set of simplified effects and periodically updating said device by transferring to it a subset of said simplified effects comprising (n) simplified effects for on-device storage and playback, which comprise at least one simulated effect and as many as (n–1) native effects, and where said at least one transferred simulated effect is a vector sum of all application program simulated effects computed by said device driver software program, and where said (n–1) transferred native effects are the (n–1) top prioritized native effects selected by said device driver software program, and where said periodic updates implement a swapping operation of the highest (n–1) top rated native effects.

20. A method for processing force feedback effect commands generated at a host computer by an application program said method comprising:

coupling to said host a device having a force feedback actuator and a memory for storing said force feedback effects;

installing on said host computer a software driver to interact with said application program running on said host computer; and classifying said force feedback effect commands using said software driver into a simulated effects and native effects categories, where simulated effects are effects which are independent of the response of said device, and native effects are force effects which are dependent on the input and response of said device;

locally processing said native effects on said device; and processing said simulated effects on said host.

21. A method for processing force feedback effect commands generated at a host computer by an application program, said method comprising:

coupling to said host a device having a force feedback actuator and a memory for storing said force feedback effects;

installing on said host computer a software driver to interact with said application program running on said host computer;

translating force feedback effect commands into a set of simplified effects including simulated and native effects;

selecting a subset of said set of simplified effects using said software driver, said subset corresponding to effects used by said application program for storage in said device at any given time, and periodically changing said subset of simplified effects stored on said device based on usage of said simplified effects.

22. A method for processing force feedback effect commands generated at a host computer by an application program, said method comprising:

coupling to said host a device having a force feedback actuator and a memory for storing said force feedback effects;

installing on said host computer a software driver to interact with said application program running on said host computer; and periodically updating said device using said software driver by transferring to it a subset of a plurality of simplified effects comprising (n) simplified effects for on-device storage and playback, which comprise at least one simulated effect not requiring feedback from said device and as many as (n−1) native effects requiring feedback from said device, computing a vector sum of all application program simulated effects using said software driver to determine said at least one simulated effect;

selecting a prioritized set of native effects using said software driver to determine said (n−1) native effects; and periodically updating said prioritized set of native effects by swapping the highest (n−1) top rated native forces.

* * * * *